United States Patent [19]

Kelley et al.

[11] Patent Number: 4,982,873
[45] Date of Patent: Jan. 8, 1991

[54] TWO-STAGE AUGER SYSTEM FOR FILLING COMMERCIAL VALVE BAGS

[75] Inventors: Robert G. Kelley, South Jordan; R. Phillip VanAusdal; Christopher S. Wadium, both of Salt Lake City, all of Utah

[73] Assignee: Stone Container Corporation, Chicago, Ill.

[21] Appl. No.: 255,364

[22] Filed: Oct. 7, 1988

[51] Int. Cl.$^5$ .................... G01G 13/02; B65G 33/32
[52] U.S. Cl. ................................. 222/77; 222/413; 198/666; 141/359
[58] Field of Search .................... 222/240–242, 222/252, 264, 280, 333, 412, 413, 77; 198/657, 666, 667, 674; 141/359; 406/53, 59; 366/292–294, 318

[56] References Cited

U.S. PATENT DOCUMENTS

| 634,793 | 10/1899 | Bachner | 141/359 |
|---|---|---|---|
| 1,192,250 | 7/1916 | Weyant | 222/413 |
| 2,209,287 | 7/1940 | Simpson | 366/294 |
| 2,279,640 | 4/1942 | Ringmarck | 198/666 |
| 2,692,714 | 10/1954 | Goldberg et al. | 222/185 |
| 3,047,034 | 7/1962 | Sassmannshausen et al. | 222/413 |
| 3,093,271 | 6/1963 | Douglas | 222/413 |
| 3,306,382 | 2/1967 | Espenschied et al. | 141/359 |
| 3,782,429 | 1/1974 | Barber | 141/359 |

FOREIGN PATENT DOCUMENTS

| 20696 | 12/1956 | Fed. Rep. of Germany | 222/413 |
|---|---|---|---|
| 108511 | 6/1875 | France | 141/359 |
| 53-27974 | 3/1978 | Japan | 222/412 |
| 59-31207 | 2/1984 | Japan | 222/413 |
| 151629 | 3/1962 | U.S.S.R. | 222/413 |
| 1316946 | 6/1987 | U.S.S.R. | 198/666 |

Primary Examiner—Joseph J. Rolla
Assistant Examiner—Steve Reiss
Attorney, Agent, or Firm—Silverman, Cass & Singer, Ltd.

[57] ABSTRACT

A two-stage auger system for filling a valve bag with a particulate material, such as dry powdered or granular material, from a hopper through a valved opening in the bag. The auger system includes a first hollow shaft carrying flights dimensioned and pitched for low speed movement of the particulate material out of the hopper and a second shaft extending through and protruding from the first shaft carrying flights on its protruding portion dimensioned and pitched for higher speed movement of the particulate material from the first mentioned flights. A filling tube is provided to cooperate with the second shaft for higher speed discharge of the particulate material through the filling tube into the bag through the valved opening. Bearings are provided to rotationally seat the second shaft member within the first shaft member on opposite ends of the first shaft member so that the second shaft member can rotate within the first shaft member. A sealing member is provided for sealing the bearings to prevent material from reaching the bearings as well as a drive member for rotating the two shafts. Variably dimensioned and pitched flights are also positioned between the flights of the first and second shafts on the second shaft to carry material between the flights of the first and second shafts, scrape material from the inner wall of the hopper, and direct material away from the sealing means.

11 Claims, 2 Drawing Sheets

TWO-STAGE AUGER SYSTEM FOR FILLING COMMERCIAL VALVE BAGS

FIELD OF THE INVENTION

This invention relates generally to apparatus for automatic packaging of particulate matter in bag-type containers, and particularly, to an improved automatic packaging system utilizing a two-stage auger for conveying granular or dry powdered materials from a hopper into a commercial valve bag and a weighing mechanism for controlling the amount of material conveyed into the bag.

BACKGROUND OF THE INVENTION

Various types of particulates, such as granular or dry powdered material, typically are shipped in reduced, manageable quantities in nonrigid containers or bags made of fabric, paper, or other suitable material Normally, these bags are filled by automatic packaging machines, the bags being referred to as "valve bags" since at least one of their ends includes some form of a valve or filling opening. The valve is structured to accommodate a filling spout or tube extending from the packaging machine and inserted into the valve orifice so that material can be transported by the machine from a storage container or hopper into the bag. These valves can be formed by a specific folding of the end flaps of the bag or can be formed as a separate sleeve integral with the end of the bag.

In order to prevent leakage during shipping and handling of the bag, it is desirable to use a valve size that is as small as possible so that the valve or opening can be sealed easily and can be maintained in a sealed condition, even during rough handling of the bag. The use of a small valve, however, necessitates the use of a small filling tube which increases the time required for filling the bag due to the small displacement of the tube. Although the flow rate through a small tube can be increased, its top speed is limited by the speed at which particulate material can be fed to the small tube. When a hopper or similar material supply means is employed, the top speed through the small tube is normally limited by the speed at which particulate material falls within the hopper due to the force of gravity. If the flow rate through the small tube exceeds the rate of gravitational material flow in the hopper, the displacement of the tube will be reduced and undesirable cavitation will occur within the hopper.

Automatic packaging machines for filling a valve bag with granular or dry powdered material from a hopper that are designed to decrease filling time by accelerating the flow rate of the material through a filling tube are known. One example of such a machine is disclosed in U.S. Pat. No. 2,279,640 which discloses a two-stage auger that is used in conjunction with a hopper and a filling tube. The hopper is filled with a predetermined measured quantity of material that is to be conveyed by the auger into the bag through the valve.

The two-stage auger includes a first portion of flights dimensioned and pitched for low speed movement of the material in the hopper and a second portion of flights dimensioned and pitched for high speed movement of the material through the filling tube. The first portion of flights is formed along the exterior of a first hollow shaft. A second shaft extends through and protrudes from opposite ends of the first hollow shaft. The second portion of flights is formed along the exterior of the second shaft on one of the portions of the second shaft protruding from the first hollow shaft. To rotationally seat the second shaft with respect to the first hollow shaft, ball bearings are positioned on either end of the first hollow shaft. To provide variable speeds between the two shafts, the two shafts are driven at their ends opposite the flights on the second shaft. Accordingly, with this type of machine the filling tube can be small to fit through the bag valve and the material flow rate in the tube can be increased to enable decreased bag filling time.

Such existing two-stage augers normally are effective only when a premeasured quantity of particulate material is supplied within the hopper. Even then, it is inevitable that precise amounts of material are not conveyed into the bag since some material will remain between flights as well as within the bottom of the hopper or the filling tube. Additionally, the transition between flights is so abrupt that the flow of the material is hampered, material can be broken down, and material can lodge in the space between the auger shafts to foul the rotational bearings.

It is also known to provide an automatic packaging machine for filling a valve bag with an automatic weighing system. Such a system typically includes an enlarged hopper having a bag filling means, a filling tube, a weighing mechanism, a bag support mounted on the weighing mechanism, and a frame which supports these items. In operation, the valve of the bag is placed on the filling spout and the bag is clamped in place on the bag support. Material is provided within the hopper and the filling means is activated to convey a portion of the material from the hopper into the bag. When the quantity of material within the bag attains a prescribed weight, the weighing mechanism, through appropriate controls, stops the filling means. The filled bag is then unclamped from the bag support and removed from the filling tube for subsequent sealing and transport.

If a two-stage auger is used with a weighing system, material would be present constantly within the hopper as well as along the flights and within the filling tube. Accordingly material could lodge more easily between the auger shafts to foul the rotational bearings even more than the two-stage augers that convey a premeasured quantity of material. Moreover, it would be even more important that a smooth transition of material flow be established between the two portions of flights especially during initial start up and stopping of the auger.

It would therefore be advantageous to provide an automatic packaging system having a two-stage auger for conveying granular or dry powdered material from an enlarged hopper to a valve bag that can be used in conjunction with a weighing mechanism that can fill a valved bag automatically with a precise amount of material. Another desirable advantage would be to provide such an automatic packaging system that includes means for independently adjusting the speeds between the two sets of auger flights to reduce undesirable material flow conditions within the system that is also capable of filling a valve bag in a decreased filling time, which does not become fouled with particulate material, and which provides a smooth transition for the material flow between the two sets of auger flights.

SUMMARY OF THE INVENTION

The invention provides a two-stage auger system for filling a valve bag with a particulate material, such as dry powdered or granular material, from a hopper through a valved opening in the bag. The auger system includes a first hollow shaft carrying flights dimensioned and pitched for low speed movement of the particulate material out of the hopper and a second shaft extending through and protruding from the first shaft carrying flights on its protruding portion dimensioned and pitched for higher speed movement of the particulate material from the first mentioned flights. A filling tube is fastened to the hopper to cooperate with the second shaft for higher speed discharge of the particulate material through the filling tube into the bag through the valved opening. Bearing means is provided to rotationally seat the second shaft member within the first shaft member on opposite ends of the first shaft member so that the second shaft member can rotate within the first shaft member. Sealing means are provided for sealing the bearing means to prevent material from reaching the bearing means as well as drive means for rotating the two shafts. Variably dimensioned a-d pitched flights are also positioned between the flights of the first and second shafts on the second shaft to carrY material between the flights of the first and second shafts, scrape material from the inner wall of the hopper, and direct material away from the sealing means.

The system can also include a cone member carrying the variably dimensioned and pitched flights to shield and direct material away from the sealing means. A weighing mechanism in operable communication with the drive means can be included to shut down the system automatically upon attaining a desired quantity of material within the bag.

DESCRIPTION OF THE PREFERRED EMBODIMENT

Figure 1:
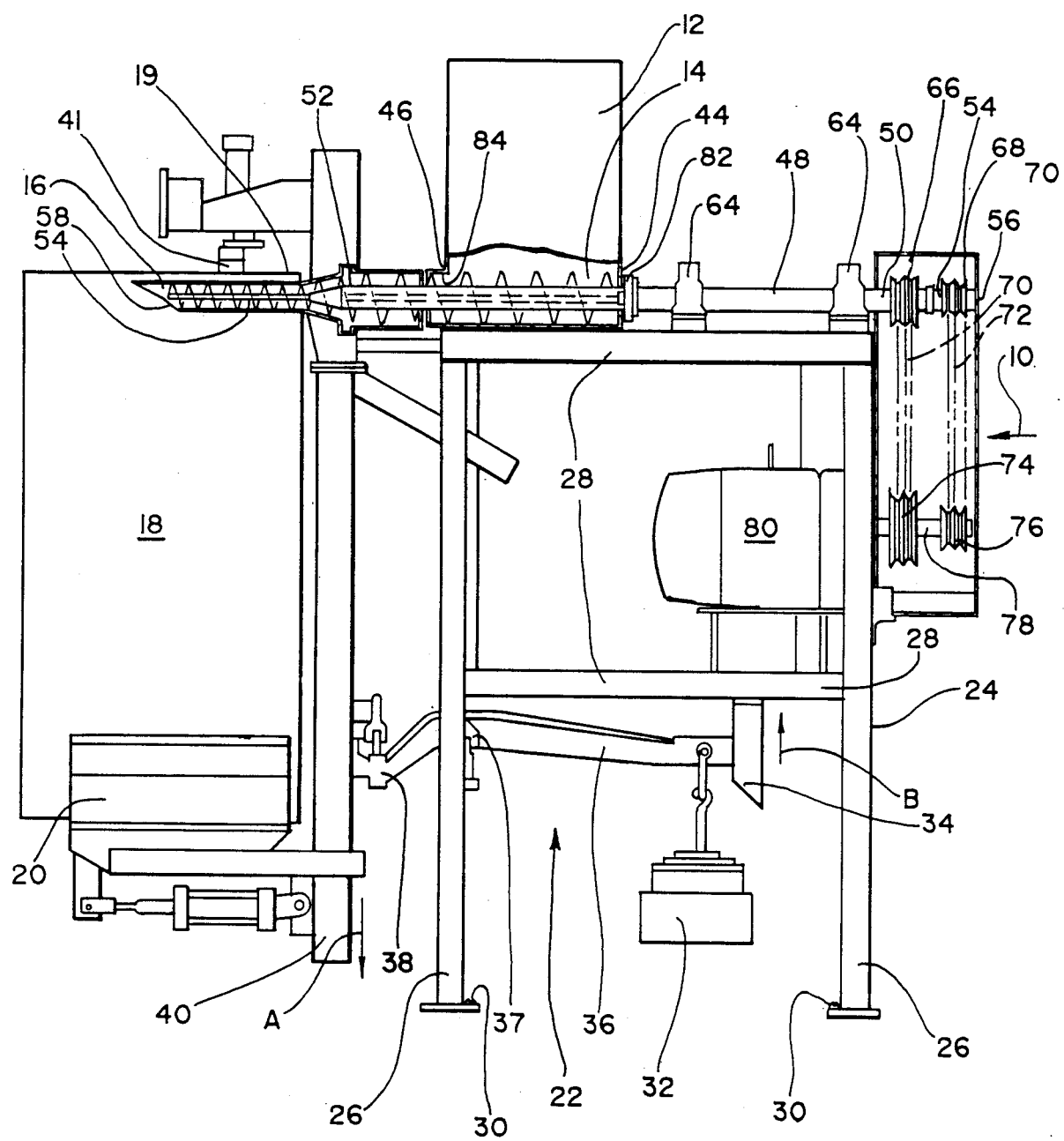
FIG. 1 is a partial fragmentary elevational view of the two-stage auger system embodying the invention installed within a hopper and filling tube, shown in conjunction with a particulate material weighing mechanism.

Referring to FIG. 1, an auger filling system or packer embodying the invention is designated generally by reference numeral 10. The system 10 includes a hopper 12, a filling auger 14, a filling tube or spout 16, a valve bag 18, a bag support 20 and a weighing mechanism 22 all supported on a frame 24.

The bag 18 can be made of fabric, paper or other suitable material which includes a valved opening 19 on its top end. To reduce the problems encountered with the sealing of the bag 18, the valved opening 19 is dimensioned to be as small as possible. The opening 19 accepts the filling tube 16 which has an outside diameter slightly smaller than the valved opening 19. To assist in the insertion and mounting of the filling tube 16 within the bag 18, the valved opening 19 can include an internal sleeve (not illustrated) that can be made of paper, plastic, or any other suitable material.

When the bag 18 is properly mounted on the filling tube 16, the filling tube 16 extends across the top inside portion of the bag 18 to a position approximately in the center of the bag 18. To assist in directing the material conveyed through the filling tube 16 toward the bottom of the bag 18, the filling tube 16 can be beveled at its distal end as illustrated in FIG. 1.

The frame 24 can be of any desired shape and size so long as it provides proper support for the necessary components. Preferably, the frame 24 is rectangular in shape having support legs 26 and cross members 28 and can be open on its top and sides if desired, the legs 26 of the frame 24 can be secured to a surface with bolts 30.

The weighing mechanism 22 is preferably of a simple mechanical design having a plurality of weights 32 secured to a first end 34 of an arm 36. The size and number of weights 32 can be changed to roughly correspond to the weight of the material to be conveyed into the bag 18. The arm 36 is pivotably mounted at 37 to the frame 24 and has a second end 38 that is in communication with a weighing frame 40. The weighing frame 40 includes the bag support 20 and a bag clamp 41 for securing the top of the bag 18 to the weighing frame 40. To provide weighing of the material within the bag 18, the weighing frame 40 is isolated from the frame member 24. Briefly, in operation when the bag 18 contains enough material to overcome the weight of the weights 32 the weighing frame 40 moves downward with respect to the frame member 24 in the direction indicated by arrow "A". The downward movement of the weighing frame 40 causes rotation of the arm 36 about the pivot 37 so that its first end 34 moves upward in the direction indicated by arrow "B". After moving a prescribed distance, the first end 34 of the arm 36 makes contact with a drive system 42 of the filling auger 14 to stop the flow of material into the bag 18. Details of the drive system 42 will be provided later. It is to be noted that the weighing mechanism 22 can be mechanical or electrical in design so long as it provides the desired function.

The hopper 12 is positioned at the top of the frame 24 and can be secured thereto, if desired. The hopper 12 preferably is rectangular in shape, having a tapered bottom to assist in material flow in the hopper 12 and includes a first shaft opening 44 and a second shaft opening 46. The hopper 12 can be large enough to contain a sufficient amount of material for filling several bags 18 and can be fed material on a continual basis from another source (not illustrated) if desired.

Figure 2:
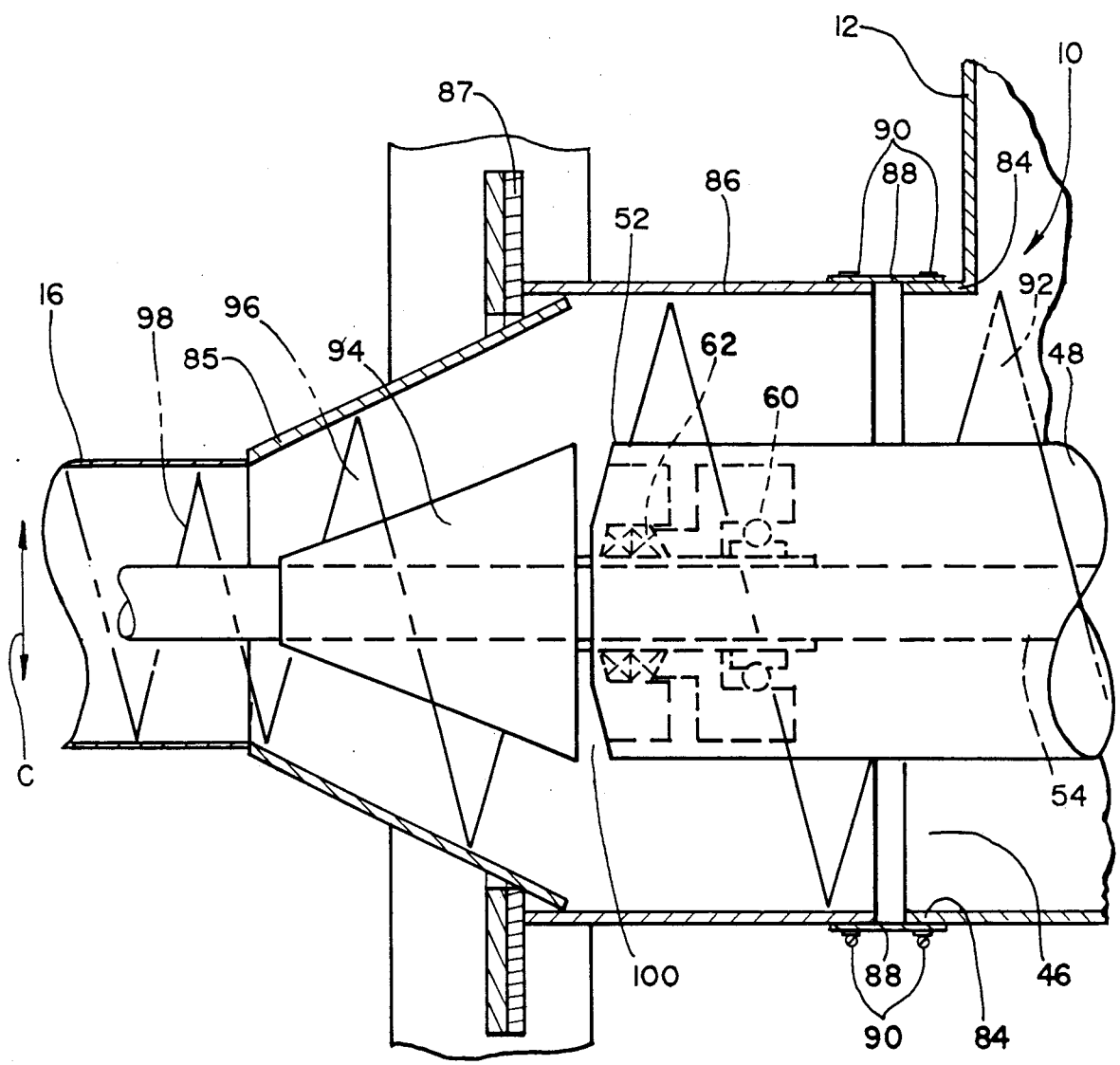
FIG. 2 is an enlarged view of the fragmentary portion of FIG. 1 illustrating the transition between flights of the first and second shafts including the variably dimensioned and pitched flights and sealing means for sealing the bearings.

As FIG. 1 illustrates, the filling auger 14 includes a first hollow shaft 48, having a first end 50 and a second end 52, and a second shaft 54, having a first end 56 and a second end 58. The second shaft 54 can be solid or hollow and extends through the first shaft 48. The first and second ends 56 and 58 of the second shaft 54 protrude from the first and second ends 50 and 52 of the first shaft 48. The second shaft 54 is rotationally supported within the first shaft 48 on ends 50 and 52 of the first shaft 48 by bearing members 60, only one of which is illustrated in FIG. 2. The bearing members 60 can be constructed in a variety of ways so long as rotational support is provided between the two shafts 48 and 54. Preferably, each of the bearing members 60 includes a bearing packing seal or member 62 that protects the bearing member 60 from contamination As FIG. 1 illustrates, the first shaft 48, with the second shaft 54 seated within it, is supported on the top of the frame 24 outside of the hopper 12 by two collars 64 secured to the frame 24 if the frame 24 is open on its top surface, appropriate support structure (not illustrated) can be provided to secure the two collars 64 to the cross members 28 of the frame 24. In either event, both of the collars 64 are positioned near the first end 50 of the first shaft 48. The collars 64 enable rotational movement therethrough of the first hollow shaft 48 as well as the second shaft 54 while providing support to the first and second shafts 48 and 54.

To provide driving of the two shafts 48 and 54 their first ends 50 and 56 can include drive pulleys 66 and 68 respectively. Each drive pulley 66 and 68 is driven through a respective drive belt or chain 70 and 72 by corresponding drive pulleys 74 and 76 positioned on a drive shaft 78 that is a part of the drive system 42. Preferably the drive system 42 consists of a drive motor 80 that can be electrically powered to rotationally drive the drive shaft 78. Alternatively, the drive system 42 can include any type of driving means, including any necessary gearing required to drive, directly or indirectly, the two shafts 48 and 54, and can include separate driving means for each of the shafts 48 and 54.

Both of the shafts 48 and 54 extend through the hopper 12 through the first shaft opening 44, across the bottom of the hopper 12, and through the second shaft opening 46. To assist in the rotation and support of the auger shafts 48 and 54, and to provide a seal between the shaft opening 44 of the Hopper 12 and the first shaft 48, the shaft opening 44 can include a support collar 82. The support collar 82 is secured within the shaft opening 44 and enables both of the shafts 48 and 54 to extend therethrough without restricting the rotation of either shaft 48 or 54.

FIG. 2 illustrates specific details of the exit side of the hopper 12. To provide a smooth transition between the hopper 12 and the filling tube 16, the second shaft opening 46 of the hopper 12 is formed with an outwardly extending annular flange 84. The filling tube 16 in turn includes an integral conical sleeve 85 secured to an extension sleeve 86 by a clamp member 87. The extension sleeve 86 is designed for registry with the outwardly extending flange 4. To fasten the extension sleeve 86 to the flange 84, a flexible annular isolator clamp 88 is positioned about the outer periphery of both members and is fastened to each member 86 and 84 by fasteners 90. Accordingly, as will be explained in detail hereinafter, to enable weighing of the bag 8, the isolator clamp 88 enables the filling tube 16 to move slightly with respect to the hopper 12 along the line "C" as the bag 18 fills up with material. This slight movement is achieved without disrupting the rotational movement of the auger shafts 48 and 54 or the material flow through the filling tube 16 or hopper 12.

To convey material from within the hopper 12 to the filling tube 16, the first shaft 48 includes a plurality of outwardly extending flights 92 around its outer periphery The flights 92 are dimensioned and pitched for large displacement, low speed movement of the material and are positioned within the bottom of the hopper 12, extend through the second shaft opening 46, the flange 84, the flexible isolator clamp 88, and slightly into the extension sleeve 86 of the filling tube 16 to a position proximate the second end 52 of the first hollow shaft 48. The flights 92 extend outwardly around the shaft 48 to a position proximate the bottom surface of the hopper 12 as well as the inner walls of the flange 84, clamp 88, and sleeve 86 so that they do not contact these members but provide the desired movement of material.

The second shaft 54 protrudes from the second end 52 of the first shaft 48 and extends through the conical sleeve 85 and the filling tube 16. To enable a smooth transition for the flow of material from the flights 92 of the first shaft 48 into the filling tube 16 as well as to provide rapid movement of material through the filing tube 16, the second shaft 54 includes a cone member 94, having a plurality of variably dimensioned and pitched flights 96, and a set of flights 98 designed for high speed movement of material having a reduced displacement with respect to the flights 92.

The cone member 94 is positioned proximate the second end 52 of the first shaft 48 Preferably, the outer diameter or outward extension of the variable flights 96 are larger on the end of the cone 94 proximate the end 52 of the first shaft 48 and become slightly smaller as they extend along the cone 94 toward the flights 98 on the second shaft 54. The variable flights 96 of the cone 94 are variably dimensioned and pitched so that they are positioned proximate the varying inside diameter of the conical sleeve 85 so that they do not contact the sleeve 85 but provide the desired movement of material from the flights 92 to the flights 98.

As FIG. 2 illustrates, the cone 94 and its variably dimensioned and pitched flights 96 cooperate to provide a smooth transition between the low speed flights 92 and the high speed flights 98. The flights 96 can also provide a scraping of the inner surface of the conical sleeve 85 to free material that may accumulate thereon. Additionally, the cooperation between the cone 94 and the variable flights 96 provides a flow of material past the second end 52 of the first shaft 48 as well as a shield for the packing seal 62 of the bearing member 60. Although some material can reach the packing seal 62 through the slight gap 100 between the cone 94 and the second end 52 of the first shaft 48, the amount of such material is minimal since the cone 94 not only acts as a shield, but tends to draw the material over the gap 100 during operation.

The high speed flights 98 on the second shaft 54 are an extension of the variably dimensioned and pitched flights 96 on the cone 94 and extend through the filling tube 16 to the second end 58 of the second shaft 54. As with flights 92 and 96, flights 98 extend outwardly to a position proximate the inner wall of the filling tube 16 without contacting the inner wall of the filling tube 16 to provide the desired movement of material.

As described briefly above, the two shafts 48 and 54 can be driven at the same or different speeds and can be adjusted to accommodate different materials and flow rates. Accordingly, the flights 92 of the first shaft 48 can be driven at a different speed than the flights 96 and 98 of the second shaft 54. This enables a two speed operation of the auger system 10. Preferably, the flights 92 of the shaft 48 are driven at a slower speed relative to the flights 96 and 98 of the shaft 54 but have a greater displacement. This allows material within the hopper 12 to flow into the flights 92 at a slower rate to allow for the gravitational fall of the material and to prevent cavitation filling tube 16 is adequately supplied during operation. When this is combined with the faster speed of the flights 96 and 98 the filling time for the bag 18 is reduced without creating any adverse affects within the hopper 12.

In operation, the bag 18 is placed on the bag support 20 and is clamped in place with the bag clamp 41 while at the same time the filling tube 16 is inserted within the bag 18 through the valved opening 19. The system 10 is then activated to convey material from the hopper 12 into the bag 18. The material can be conveyed to the hopper 12 by any desired means or the hopper 12 can be large enough to handle a large quantity of material to fill more than one bag 18. As the bag 18 begins to fill, the weights 32 maintain the bag 18 in a constant position with respect to the filling tube 16. When the bag 18 contains enough material to overcome the influence of the weights 32, the bag 18 and the weighing frame 40 begin to descend slightly in the direction of arrow "A" and slightly displace the filling tube 16 through the flexible clamp 88 so that filling of bag 18 can continue until the bag 18 is filled to a desired amount corresponding to the amount of the weights 32. Upon downward movement of the second end 38 of the arm 36, the first end 34 moves upward in the direction of arrow "B". Continued upward movement of the first end 34 enables the fastener 34 to contact a shut off switch (not illustrated) of the drive system 42 to shut down the system 10 and stop the filling of the bag 18. The bag 18 can then be removed from the bag clamp 41, the bag support 20, and the filling tube 16 and can be transported for sealing, storage or shipping It is to be noted that due to the flexible clamp 88, as the bag 18 descends, the extension sleeve 86 of the filling tube 16 can move slightly along with the bag 18 to enable weighing of the bag 18 and prevent damage to the filling tube 18 or the bag 18. The movement of the extension sleeve 86, however, is slight since it is restricted by the engagement of the flights 96 and/or 98 with the interior walls of the filling tube 16. This slight movement is all that is necessary since the first end 34 of the arm 36 need only travel a slight distance to contact the drive system 42.

We claim:

1. In a two-stage auger system for filling a valve bag with particulate materials from a hopper through a valved opening in the bag, the auger system comprising: a first hollow shaft carrying a first set of flights dimensioned and pitched for low speed movement of the material out of the hopper and a second shaft extending through and protruding from the first shaft carrying a second set of flights on its protruding portion dimensioned and pitched for higher speed movement of the material from said first set of flights, a filling tube fastened to said hopper and cooperating with said second shaft and said second set of flights for higher speed discharge of said material from said hopper through said filling tube into the bag through the valved opening, bearing means for rotationally seating said second shaft member within said first shaft member at opposite ends of said first shaft member to that said second shaft member can rotate within said first shaft member, sealing means for sealing said bearing means to prevent material from reaching said bearing means, driving means for rotating said first and second shafts, and a third set of flights which are variably dimensioned and pitched and positioned between said first and second sets of flights of said first and second shafts on said second shaft so that said variably dimensioned and pitched flights carry said material between said first and second sets of flights of said first and second shafts, scrape material from the inner wall of the hopper and direct material away from said sealing means.

2. The system as defined in claim 1 including means for flexibly coupling said filling tube to said hopper.

3. The system as defined in claim 2 including a frame member arranged to support said system.

4. The system as defined in claim 3 wherein said frame member includes a first frame member arranged to provide stationary support to said system and a second frame member isolated from and in movable engagement with said first frame member, said second frame member arranged to provide support to said bag and capable of moving with respect to said first frame member 5. The system as defined in claim 4 including means for weighing said second frame member and said bag.

6. The system as defined in claim 5 including actuator means cooperating with said weighing means for activating and deactivating said drive means so that upon attaining a desired weight of material in said bag said weighing means can deactivate said drive means with said actuator means.

7. The system as defined in claim 1 wherein said protruding portion of said second shaft includes an outwardly extending cone positioned about said second shaft proximate to and with its larger diameter end in registry with said first shaft for shielding and directing material away from said sealing means, said variably dimensioned and pitched flights being positioned around the outer periphery of said cone.

8. The system as defined in claim 1 wherein said third set of flights of said second shaft is positioned outside of said filling tube.

9. The system as defined in claim 1 wherein said third set of flights is formed as a portion of said second set of flights.

10. The system as defined in claim 1 wherein the diameter of said second shaft is substantially constant along the length of said second shaft.

11. A two-stage auger for filling a valve bag with particulate materials through a valved opening in the bag, the auger comprising: a first hollow shaft carrying a first set of flights dimensioned and pitched for low speed movement of the material and a second shaft extending through and protruding from the first shaft carrying a second set of flights on its protruding portion dimensioned and pitched for higher speed movement of the material from said first set of fights, a filling tube cooperating with said second shaft and said second set of flights for higher speed discharge of said material through said filling tube into the bag through the valved opening, bearing means for rotationally seating said second shaft member within said first shaft member at opposite ends of said first shaft member so that said second shaft member can rotate within said first shaft member, sealing means for sealing said bearing means to prevent material from reaching said bearing means, driving means for rotating said first and second shafts, and a third set of flights which are variably dimensioned and pitched and positioned between said first and second sets of flights of said first and second shafts on said second shaft so that said variably dimensioned and pitched flights carry said material between said first and second sets of flights of said first and said second shafts, scrape material from the inner wall of said filling tube and direct material away from said sealing means.

* * * * *

UNITED STATES PATENT AND TRADEMARK OFFICE
CERTIFICATE OF CORRECTION

PATENT NO. : 4,982,873

DATED : January 8, 1991

INVENTOR(S) : Robert G. Kelley, R. Phillip Van Ausdal and Christopher S. Wadium

It is certified that error appears in the above-identified patent and that said Letters Patent is hereby corrected as shown below:

Column 3, line 24, delete "a-d" and insert --and--;

Column 3, line 26, delete "carrY" and insert --carry--;

Column 4, line 14, delete "if" and insert --. If--;

Column 4, line 28 after "operation" insert --,--;

Column 5, line 13, after "54" insert --,--;

Column 5, line 45, delete "4" and insert --84--;

Column 5, line 50, delete "8" and insert --18--;

Column 5, lines 59-60, after "periphery" insert --.--;

Column 6, line 63-64, after "cavitation" insert

--of the material within the hopper 12 while insuring that the--; and

UNITED STATES PATENT AND TRADEMARK OFFICE
CERTIFICATE OF CORRECTION

PATENT NO. : 4,982,873
DATED : January 8, 1991
INVENTOR(S) : Robert G. Kelley, et. al.

It is certified that error appears in the above-identified patent and that said Letters Patent is hereby corrected as shown below:

Column 8, line 6, before "variably" insert --third set of--.

Signed and Sealed this

First Day of September, 1992

Attest:

DOUGLAS B. COMER

*Attesting Officer*   *Acting Commissioner of Patents and Trademarks*